(12) United States Patent
Watanabe et al.

(10) Patent No.: US 8,179,650 B2
(45) Date of Patent: May 15, 2012

(54) POWER SUPPLY APPARATUS

(75) Inventors: Kozo Watanabe, Osaka (JP); Hajime Nishino, Nara (JP); Kazuya Maegawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1038 days.

(21) Appl. No.: 12/119,237

(22) Filed: May 12, 2008

(65) Prior Publication Data

US 2008/0285193 A1   Nov. 20, 2008

(30) Foreign Application Priority Data

May 18, 2007   (JP) ................. 2007-132731

(51) Int. Cl.
H02H 9/02   (2006.01)
(52) U.S. Cl. ....................................... 361/93.1
(58) Field of Classification Search .................. 361/93.1
See application file for complete search history.

(56) References Cited

U.S. PATENT DOCUMENTS 5,948,556 A * 9/1999 Hall et al. .......................... 429/7
2006/0186857 A1 * 8/2006 Matty et al. .................... 320/122
2009/0234598 A1 * 9/2009 Angquist et al. ................ 702/63

FOREIGN PATENT DOCUMENTS

JP   2002-008631   1/2002
WO   WO 2007102758 A1 * 9/2007

* cited by examiner

*Primary Examiner* — Rexford Barnie
*Assistant Examiner* — Ann Hoang
(74) *Attorney, Agent, or Firm* — McDermott Will & Emery LLP

(57) ABSTRACT

A power supply apparatus includes: a plurality of batteries; a changeover portion switching the connection between the plurality of batteries; a short-circuit battery detection portion, if an internal short-circuit is produced in any of the plurality of batteries, detecting this internal short-circuit battery; and a changeover control portion, if the short-circuit battery detection portion detects the internal short-circuit battery, allowing the changeover portion to switch the connection between the plurality of batteries in such a way that this internal short-circuit battery and at least one of the other batteries are connected in series to thereby form a closed circuit.

4 Claims, 12 Drawing Sheets

POWER SUPPLY APPARATUS

BACKGROUND OF THE INVENTION

1. Field of the Invention

The present invention relates to a power supply apparatus provided with a plurality of batteries.

2. Description of the Background Art

Conventionally, a so-called battery pack made up of a plurality of batteries has been used as a power supply apparatus which supplies electric power for driving a potable electrical apparatus such as a cellular phone, a digital video camera and a notebook personal computer. A plurality of batteries are also used in a large power-supply apparatus employed as a back-up power-supply apparatus at a factory, a hospital or the like, an automobile-motor power source or the like. A lithium-ion secondary battery has been widely used as a battery for such a power supply apparatus.

A lithium-ion secondary battery has a great electromotive force though it is light, and a high energy density. These characteristics are useful to a power source for driving a potable electronic apparatus of each type such as a cellular phone, a digital camera, a video camera and a notebook personal computer, or a mobile communication apparatus. Hence, the demand for such a battery has been increasingly greater. As a large power-supply system has also been developed, such a battery is in a greater demand for a back-up power-supply apparatus or an automobile-motor power source.

A lithium-ion secondary battery is formed by: a positive electrode plate made of a lithium-containing multiple oxide; a negative electrode including a negative-electrode active material which inserts and extracts a metallic lithium, a lithium alloy or and a lithium ion; and an electrolyte. Most of lithium-ion secondary batteries currently on the market are provided as a positive-electrode active material thereof with a lithium-containing cobalt multiple oxide $Li_xCoO_2$ (x is a numeric value indicating the quantity of lithium contained in an active material and varies according to the charge and discharge of a battery). On the other hand, a graphite material is used for a negative-electrode active material thereof.

A battery, particularly, a lithium-ion secondary battery formed in this way has a disadvantage as follows. If some metal gets mixed into a battery in a battery manufacturing process or the like, this mixed metal may be conductive and cause an internal short-circuit between its positive electrode and negative electrode. Besides, an internal short-circuit may be triggered off through the repetition of charge and discharge, a vibration, a change in temperature or the like. Especially, since a lithium-ion secondary battery or the like is provided with an organic electrolyte, it can generate heat rapidly upon undergoing an internal short-circuit. This may generate some gas suddenly or raise the temperature, thereby bringing a safety valve provided in a sealing plate into operation. As a result, the battery can be unusable.

In order to solve these problems, a method of providing a by-pass circuit formed by a resistor or a capacitor for a battery subjected to an internal short-circuit, taking energy inside of the battery as an electric current to the outside and absorbing the energy through a resistance loss or the like is presented (e.g., refer to Japanese Patent Laid-Open Publication No. 2002-8631).

As the power and capacity of a battery has recently been increased, the energy of a battery subjected to an internal short-circuit needs to be released and absorbed in a greater amount. However, in the above described method, in order to increase the amount of energy released and absorbed from the battery, the resistance value of an energy absorber has to be made smaller to thereby raise the internal-energy release amount from this short-circuit battery. But there is a limit to such a reduction in the resistance value of the energy absorber. In short, this method is useless in coping with the recent larger capacity and power of a battery. The internal energy cannot be released enough, and thus, Joule heat is generated in a greater quantity from an electric current flowing through the part of an internal short-circuit. This causes sharp rises in the temperature and internal pressure of a battery, thus deteriorating its safety.

SUMMARY OF THE INVENTION

It is an object of the present invention to provide a power supply apparatus which is capable of improving safety when an internal short-circuit is produced in a battery.

A power supply apparatus according to an aspect of the present invention includes: a plurality of batteries; a changeover portion switching the connection between the plurality of batteries; a short-circuit battery detection portion, if an internal short-circuit is produced in any of the plurality of batteries, detecting this internal short-circuit battery; and a changeover control portion, if the short-circuit battery detection portion detects the internal short-circuit battery, allowing the changeover portion to switch the connection between the plurality of batteries in such a way that this internal short-circuit battery and at least one of the other batteries are connected in series to thereby form a closed circuit.

In the power supply apparatus configured in this way, if an internal short-circuit is produced in any of the plurality of batteries, the short-circuit battery detection portion detects this internal short-circuit battery. Then, the changeover control portion allows the changeover portion to switch the connection between the plurality of batteries in such a way that the internal short-circuit battery and at least one of the other batteries are connected in series to thereby form a closed circuit. Thereby, to both ends of the internal short-circuit battery, in other words, both ends of the part where the internal short-circuit is produced, a voltage having a mutually reverse polarity is applied to thereby offset each other. This lowers the voltage given to the internal short-circuit part, reduces the electric current sent to the internal short-circuit part and decreases the heat generated in the internal short-circuit part. This makes it possible to enhance safety when an internal short-circuit is produced in a battery.

These and other objects, features and advantages of the present invention will become more apparent upon reading of the following detailed description along with the accompanied drawings.

DESCRIPTION OF THE PREFERRED EMBODIMENTS

Figure 1:
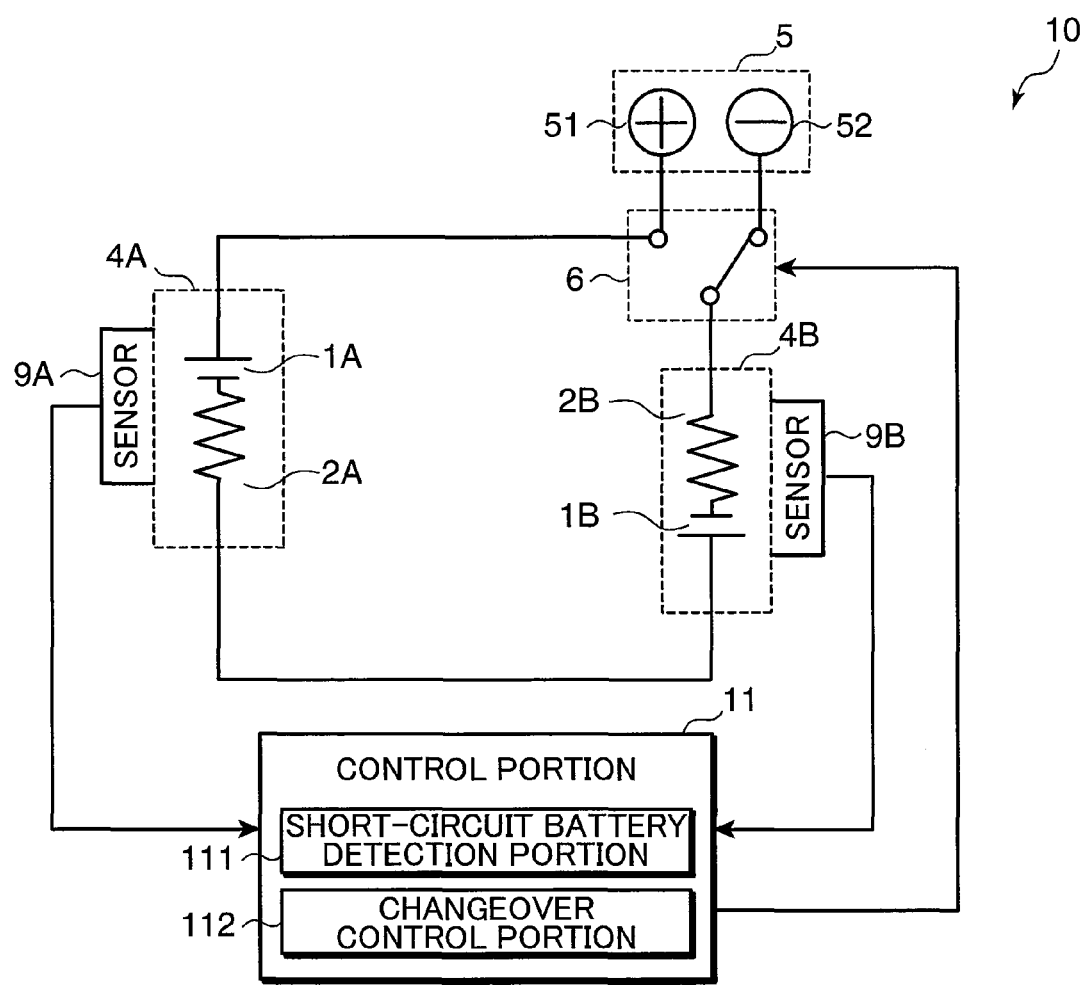
FIG. 1 is a circuit diagram showing an example of the configuration of a power supply apparatus according to a first embodiment of the present invention.

Embodiments of the present invention will be below described with reference to the drawings. In each figure, component elements are given the same reference characters and numerals, as long as they are identical to one another. Thus, their description is omitted. The present invention is not limited to the contents described below, so long as it is based on the basic characteristics described herein.

(First Embodiment)

FIG. 1 is a circuit diagram showing an example of the configuration of a power supply apparatus according to a first embodiment of the present invention. A power supply apparatus 10 shown in FIG. 1 includes: batteries 4A and 4B; a terminal 5; a changeover switch 6 (the changeover portion); sensors 9A and 9B; and a control portion 11. The terminal 5 is a connection terminal for outputting an output power of the batteries 4A and 4B connected in series. The terminal 5 includes a positive electrode terminal 51 and a negative electrode terminal 52. The changeover switch 6 is used for forming a bridge circuit (closed circuit: described later) in response to a control signal from the control portion 11. It is formed, for example, by a switching element such as a transistor.

The positive electrode terminal 51 is connected to the positive electrode of the battery 4A; the negative electrode of the battery 4A is connected to the positive electrode of the battery 4B; and the negative electrode of the battery 4B is connected to the changeover switch 6. In accordance with a control signal from the control portion 11, the changeover switch 6 ordinarily connects the negative electrode of the battery 4B to the negative electrode terminal 52. On the other hand, it connects the negative electrode of the battery 4B to the positive electrode of the battery 4A if an internal short-circuit is produced in the battery 4A, 4B. Thereby, the batteries 4A and 4B are connected in series to thereby form a closed circuit.

The battery 4A is formed by connecting a power generating element 1A and an internal resistor 2A equivalently in series. Similarly, the battery 4B is formed by connecting a power generating element 1B and an internal resistor 2B equivalently in series. The battery 4A and the battery 4B have substantially the same capacity, configuration and potential. The power generating element 1A and the power generating element 1B alike have substantially the same characteristics. Likewise, the internal resistor 2A and the internal resistor 2B have substantially the same resistance value. Herein, "substantially the same" means including a variation range caused by an unintended element such as a dispersion or an error in production, and resistance in wiring or on-resistance of a switch (described later) within the same range.

The sensors 9A and 9B sense a physical quantity for detecting an internal short-circuit produced in the batteries 4A and 4B, respectively. They output a signal indicating such a physical quantity to the control portion 11. Specifically, the sensors 9A and 9B are formed, for example, by any one or a combination of various sensors, such as a voltmeter detecting each terminal voltage of the batteries 4A and 4B, an ammeter detecting an electric current flowing through the batteries 4A and 4B, and a temperature sensor detecting the temperature of the batteries 4A and 4B. A thermocouple, an infrared sensor or the like may be used as the temperature sensor. Further, an electric current (a variation in an electric current) may be detected, for example, by a sensor detecting an electric current magnetically such as a Hall element. Or, a current value may also be detected as a voltage value, for example, by a shunt resistor.

The control portion 11 is configured, for example, by a CPU (central processing unit) executing a predetermined arithmetic processing, a ROM (read only memory) having a predetermined control program in storage, a RAM (random access memory) storing data temporarily, a peripheral circuit thereof and the like. It functions as a short-circuit battery detection portion 111 and a changeover control portion 112 by executing the control program stored in the ROM.

If an internal short-circuit is produced in either of the batteries 4A and 4B, the short-circuit battery detection portion 111 identifies this internal short-circuit battery based on information on a voltage, an electric current, a temperature or the like detected from the batteries 4A and 4B by the sensors 9A and 9B, respectively. If the internal short-circuit is produced in the battery 4A, 4B, that causes a fall in the terminal voltage or output current of the battery 4A, 4B, a rise in the temperature thereof or the like.

Therefore, the short-circuit battery detection portion 111 may also detect the internal short-circuit and identify the internal short-circuit battery when the terminal voltage of the battery 4A, 4B detected by the sensor 9A, 9B drops below a preset voltage within a predetermined time, when the temperature of the battery 4A, 4B detected by the sensor 9A, 9B rises beyond a preset temperature, or in another such case.

If a battery is subjected to an internal short-circuit, its current power falls. Thereby, if this internal short-circuit battery is connected in parallel with a plurality of batteries, the electric current of the other batteries connected in parallel flows into the internal short-circuit battery. This can reverse the direction of the electric current flowing along the circuit connected to the internal short-circuit battery. The short-circuit battery detection portion 111 may detect this variation in the electric current and identify the internal short-circuit battery.

If the short-circuit battery detection portion 111 detects the battery subjected to the internal short-circuit, the changeover control portion 112 changes the changeover switch 6 in such a way that the negative electrode of the battery 4B is connected to the positive electrode of the battery 4A. Thereby, this internal short-circuit battery and the other batteries are connected in series to thereby form a closed circuit.

Figure 2:
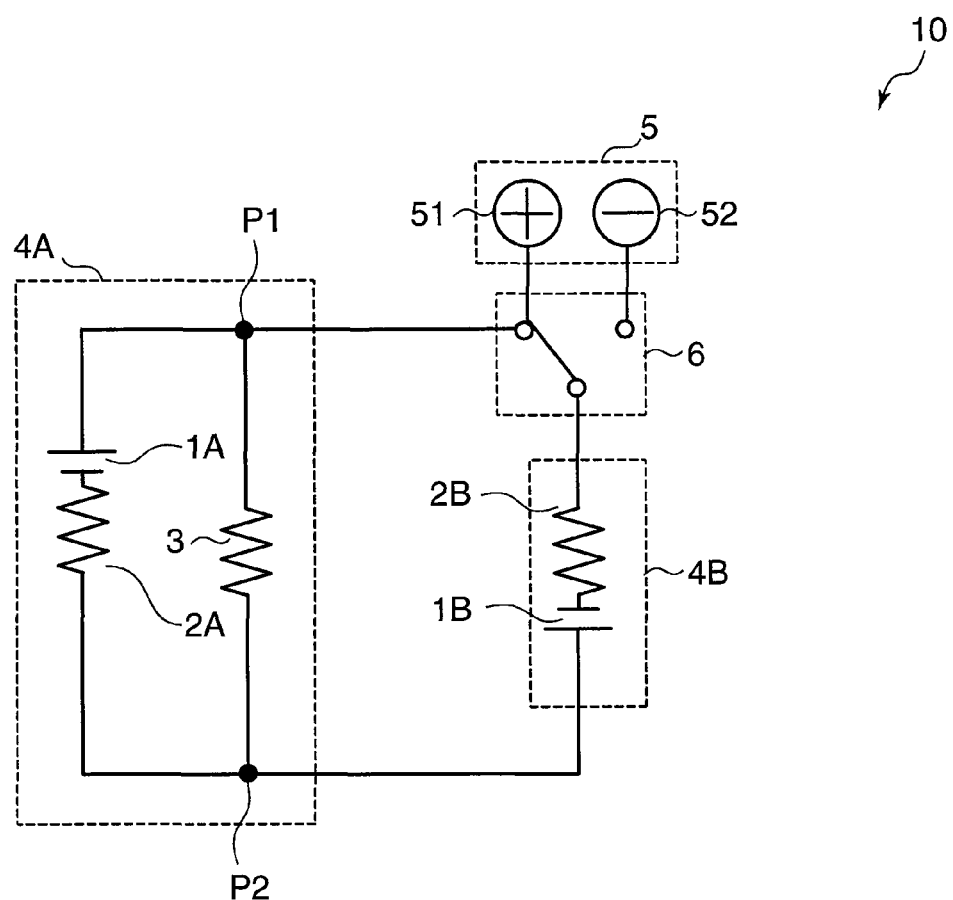
FIG. 2 is a circuit diagram showing an operation of the power supply apparatus of FIG. 1.

Next, an operation will be described of the power supply apparatus 10 having the above configuration. FIG. 2 is a circuit diagram showing an operation of the power supply apparatus of FIG. 1. In FIG. 2, the sensors 9A and 9B and the control portion 11 are omitted, and an internal short-circuit is produced in the battery 4A to thereby form an internal short-circuit part 3.

On the basis of a voltage, an electric current or a temperature or the like detected from the battery 4A by the sensor 9A, the short-circuit battery detection portion 111 detects the internal short-circuit produced in the battery 4A. Then, the changeover control portion 112 changes the changeover switch 6 in such a way that the negative electrode of the battery 4B is connected to the positive electrode of the battery 4A. Thereby, the battery 4A and the battery 4B are connected in series to thereby form a closed circuit.

Figure 3:
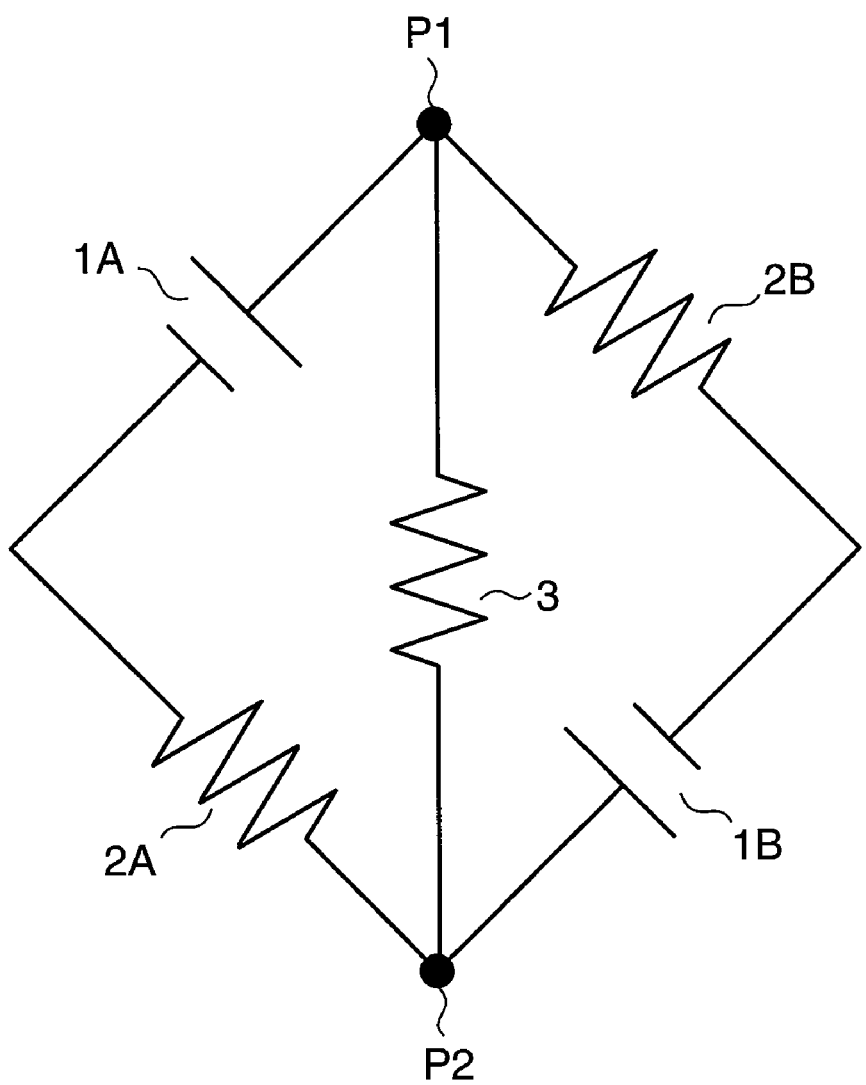
FIG. 3 is a circuit diagram showing a closed circuit formed by changing a changeover switch in the power supply apparatus of FIG. 2.

FIG. 3 is a circuit diagram equivalently showing the closed circuit formed by changing the changeover switch 6 in such a way that the negative electrode of the battery 4B is connected to the positive electrode of the battery 4A. The closed circuit shown in FIG. 3 has the power generating element 1A, the internal resistor 2A, the power generating element 1B and the internal resistor 2B connected in series. Further, a connection point P1 of the power generating element 1A and the internal resistor 2B is connected via the internal short-circuit part 3 to a connection point P2 of the internal resistor 2A and the power generating element 1B. This is called a bridge circuit.

In the bridge circuit shown in FIG. 3, the voltage applied between the connection points P1 and P2 by the series circuit of the power generating element 1A and the internal resistor 2A has a reverse polarity to the voltage applied between the connection points P1 and P2 by the series circuit of the power generating element 1B and the internal resistor 2B. Thereby, they offset each other. This lowers the voltage given between the connection points P1 and P2, in other words, to the internal short-circuit part 3, and reduces the electric current sent to the internal short-circuit part 3.

Herein, the electromotive force of the power generating element 1A is Va, the electromotive force of the power generating element 1B is Vb, the resistance value of the internal resistor 2A is Ra and the resistance value of the internal resistor 2B is Rb. Desirably, Va, Vb, Ra and Rb should satisfy a relationship given by the following expressions (1) and (2).

$$Va = \alpha \times Vb$$

Herein, $0.9 \leq \alpha \leq 1.1$ \hfill (1)

$$Ra = \beta \times Rb$$

Herein, $0.9 \leq \beta \leq 1.1$ \hfill (2)

Consequently, the electric current flowing through the internal short-circuit part 3 is reduced to thereby restrain the internal short-circuit part 3 from generating heat. This helps make the power supply apparatus 10 safer. The power supply apparatus 10 becomes more effective by using a high-voltage and high-power battery such as a non-aqueous-electrolyte lithium secondary battery having greater energy as the batteries 4A and 4B. Besides, an internal short-circuit part in a battery can be restrained from generating heat. As a result, this internal short-circuit battery can also be kept from a sharp rise in its internal pressure caused by generation of excessive heat or production of gas. Consequently, even if an internal short-circuit is produced in any battery provided in a power supply apparatus, a safety valve or the like of the battery can be restrained from working. This makes it possible to provide a safer and more reliable power supply apparatus.

As describe above, it is preferable that in the plurality of batteries 4A and 4B forming a power supply apparatus, for example, the power supply apparatus 10, the differences in the values of capacity, voltage and internal resistance between those be within a range of ten percent of these values. Particularly, as is the case with the power supply apparatus 10, if the battery 4A subjected to the internal short-circuit is connected in series with the other battery 4B, preferably, the differences in capacity, voltage and internal resistance between the internal short-circuit battery and the other battery be as small as possible. Even if the differences between the capacity, voltage and internal resistance values of batteries forming a power supply apparatus be beyond a range of ten percent of these values, then for example, a variable resistor or the like can be provided and, for example, form a closed circuit together with the batteries 4A and 4B and the changeover switch 6. The variable resistor can adjust the resistance of the closed circuit to thereby reduce the electric current flowing through the internal short-circuit part.

As given in Background describe above, in order to take and absorb energy from a battery subjected to an internal short-circuit, a power supply apparatus provided with a plurality of batteries needs to include an energy absorber attached to each battery. This makes the configuration of power supply apparatus quite complex. In contrast, the power supply apparatus 10 of FIG. 1 allows the changeover switch 6 to switch the connection between the batteries in such a way that the internal short-circuit battery and the other battery are connected in series to thereby form a closed circuit. Consequently, the electric current flowing through the internal short-circuit part 3 is reduced to thereby improve the safety of the power supply apparatus 10. Compared with the power supply apparatus given in Background, the circuit can be more easily simplified. Besides, there is no need to provide an energy absorber additionally for extracting energy from a battery subjected to an internal short-circuit. Although the resistance value of a loss resistance in an energy absorber has to be lowered as the capacity of a battery becomes greater in the power supply apparatus of Background, this problem can be evaded in the power supply apparatus 10.

(Second Embodiment)

Figure 4:
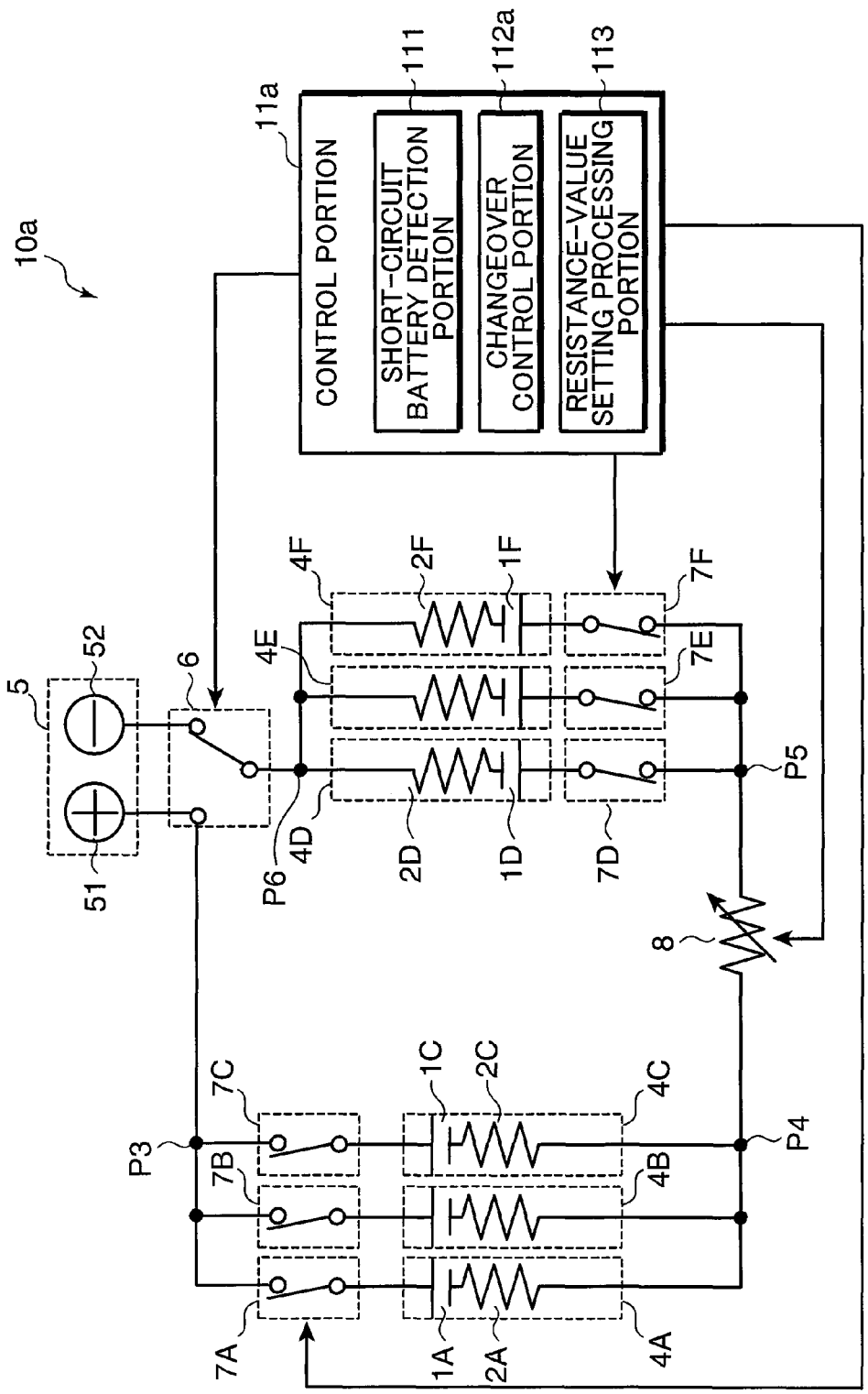
FIG. 4 is a circuit diagram showing an example of the configuration of a power supply apparatus according to a second embodiment of the present invention.

Next, a description will be given about a power supply apparatus according to a second embodiment of the present invention. FIG. 4 is a circuit diagram showing an example of the configuration of a power supply apparatus 10a according to the second embodiment. The power supply apparatus 10a shown in FIG. 4 is different from the power supply apparatus 10 shown in FIG. 1 in the following respect. The power supply apparatus 10a shown in FIG. 4 includes six batteries, i.e., three in parallel connected in two series. Specifically, the power supply apparatus 10a is configured by: connecting in parallel a series circuit of a switch 7A and a battery 4A, a series circuit of a switch 7B and a battery 4B and a series circuit of a switch 7C and a battery 4C; and connecting in parallel a series circuit of a switch 7D and a battery 4D, a series circuit of a switch 7E and a battery 4E and a series circuit of a switch 7F and a battery 4F.

The switches 7A to 7F are formed, for example, by a switching element such as a transistor and correspond to an example of the changeover portion. The positive electrode terminal 51 is connected to a connection point P3 of the switches 7A, 7B and 7C. A connection point P4 of the batteries 4A, 4B and 4C is connected to a connection point P5 of the switches 7D, 7E and 7F via a variable resistor 8 (the resistor portion). Thereby, the battery block of the three batteries 4A, 4B and 4C connected in parallel is connected in series with the battery block of the three batteries 4D, 4E and 4F connected in parallel. Further, a connection point P6 of the batteries 4D, 4E and 4F is connected to the changeover switch 6.

The batteries 4A to 4F are each provided with a sensor (not shown) similar to the sensor 9A. Each sensor detects a physical quantity for sensing an internal short-circuit in each battery and outputs it to a control portion 11a.

If the short-circuit battery detection portion 111 detects a battery subjected to an internal short-circuit, a changeover control portion 112a of the control portion 11a allows the changeover switch 6 to connect the connection point P6 to the connection point P3 in such a way that the battery block including this internal short-circuit battery and the other battery block and the variable resistor 8 are connected in series to thereby form a closed circuit. Then, the changeover control portion 112a turns off the switches 7 connected in series with the other batteries in the battery block including the internal short-circuit battery. A resistance-value setting processing portion 113 adjusts the resistance value of the variable resistor 8 so as to decrease the electric current flowing through the part of the internal short-circuit.

Figure 5:
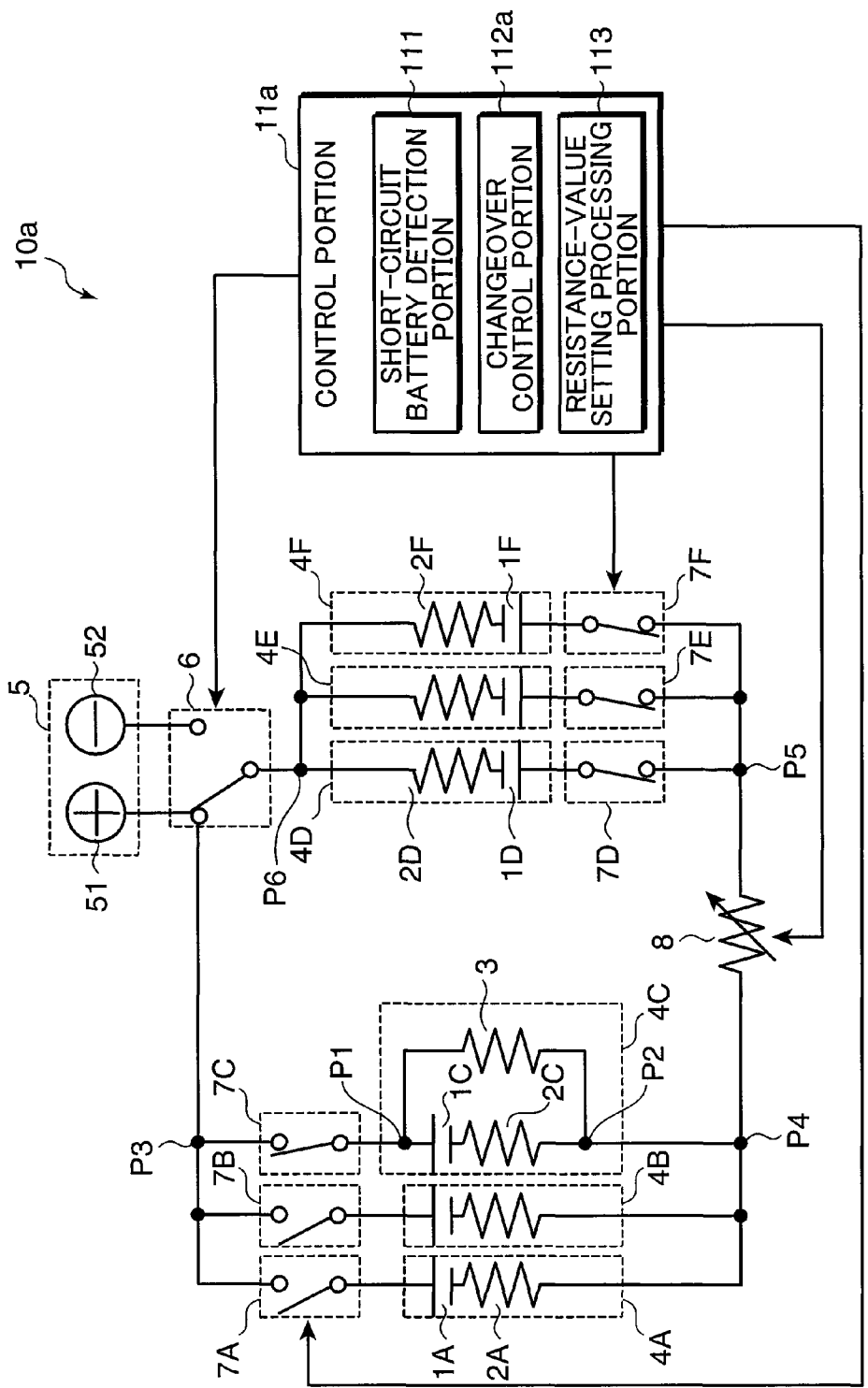
FIG. 5 is a circuit diagram showing an operation of the power supply apparatus of FIG. 4.

The other configurations are the same as those of the power supply apparatus 10 shown in FIG. 1, and thus, their description is omitted. An operation of the power supply apparatus 10a shown in FIG. 4 will be below described. FIG. 5 is a circuit diagram showing an operation of the power supply apparatus of 10a of FIG. 4. In FIG. 5, an internal short-circuit is produced in the battery 4C to thereby form an internal short-circuit part 3.

On the basis of a voltage, an electric current or a temperature or the like detected from the battery 4C by the sensor (not shown), the short-circuit battery detection portion 111 detects the internal short-circuit produced in the battery 4C. In response to a control signal from the changeover control portion 112a, the switches 7A and 7B connected in series with the other batteries 4A and 4B in the battery block including the battery 4C are turned off. This separates the batteries 4A and 4B from the battery 4C, so that the output current of the batteries 4A and 4B will not flow through the internal short-circuit part 3. This helps reduce the heat generated by the internal short-circuit part 3, thus enhancing the safety.

Sequentially, the changeover switch 6 is changed in response to a control signal from the changeover control portion 112a in such a way that the connection point P6 is connected to the connection point P3. Thereby, the parallel circuit of the batteries 4D, 4E and 4F, the battery 4C and the variable resistor 8 are connected in series to thereby form a closed circuit.

In the above example, the battery 4C in which the internal short-circuit has been produced is connected in series with the plurality of batteries 4D, 4E and 4F connected in parallel. However, this internal short-circuit battery 4C may also be connected in series with a single battery.

Figure 6:
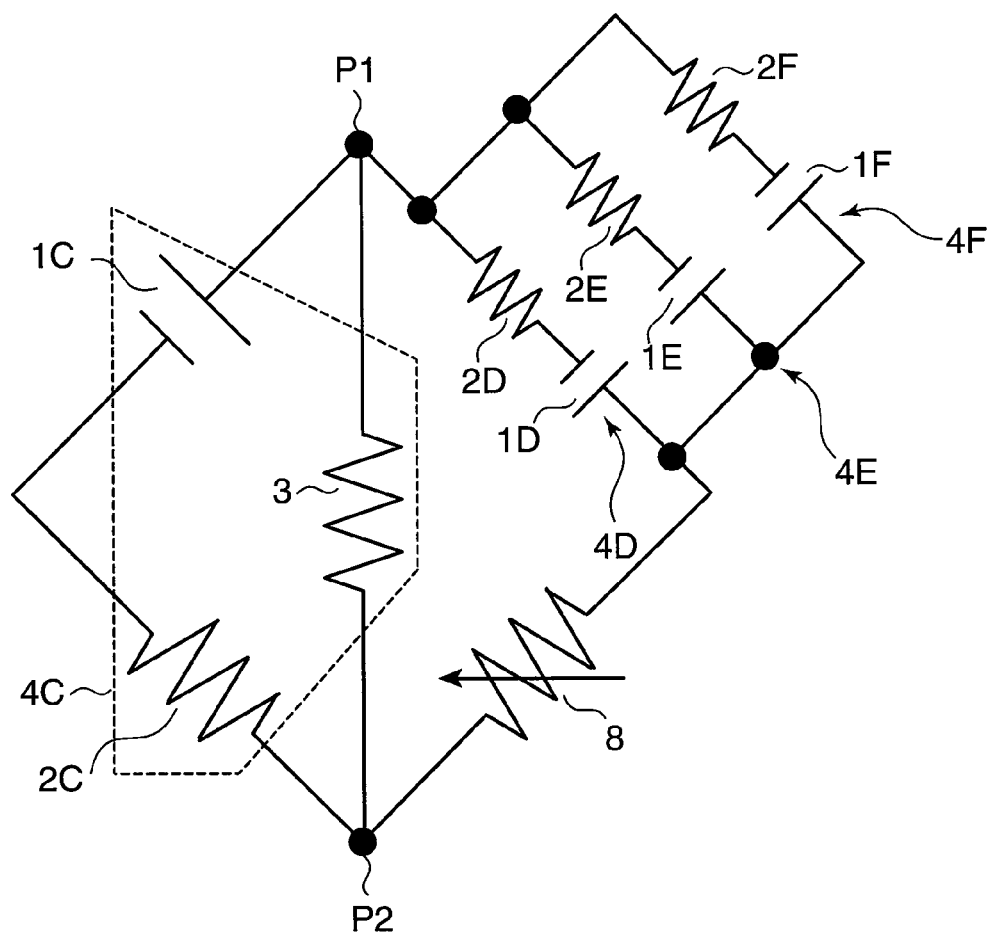
FIG. 6 is a circuit diagram showing a closed circuit formed by changing a changeover switch in the power supply apparatus of FIG. 2.

FIG. 6 is a circuit diagram showing a closed circuit formed when the changeover switch 6 has connected the connection point P6 and the connection point P3. In the bridge circuit shown in FIG. 6, the voltage applied between the connection points P1 and P2 by the series circuit of a power generating element 1C and an internal resistor 2C has a reverse polarity to the voltage applied between the connection points P1 and P2 by the parallel circuit of the batteries 4D, 4E and 4F. Thereby, they offset each other. This lowers the voltage given between the connection points P1 and P2, in other words, to the internal short-circuit part 3, and reduces the electric current sent to the internal short-circuit part 3.

In the bridge circuit of FIG. 6, let's assume that all the resistance values of the internal resistors 2C, 2D, 2E and 2F of the batteries 4C, 4D, 4E and 4F are the same Ri. When the resistance value of the variable resistor 8 is Rv and the number of the parallel batteries in each battery block is n, if the relationship given by the following expression (3) is satisfied, the potential difference applied between both ends of the internal short-circuit part 3 of the battery 4C becomes substantially zero volts. Consequently, the electric current flowing through the internal short-circuit part 3 is reduced to thereby suppress the Joule heat generated by the internal short-circuit part 3 from generating heat. This helps make the power supply apparatus 10a safer.

$$Rv + Ri/n = Ri \quad (3)$$

$$Rv = Ri - Ri/n$$
$$= Ri \times (n-1)/n$$

Herein, an unintended closed-circuit resistance is Rc, such as resistance in the wiring connecting the batteries 4C, 4D, 4E and 4F, the variable resistor 8 and the changeover switch 6, and on-resistance of the changeover switch 6, then the expression (3) is replaced with the following more precise expression (4).

$$Rv + Ri/n + Rc = Ri \quad (4)$$

$$Rv = Ri - Ri/n - Rc$$
$$= (Ri \times (n-1)/n) - Rc$$

In the power supply apparatus 10a shown in FIG. 4, n=3.

$$Rv = 2 \times Ri/3 - Rc \quad (5)$$

If the resistance value Rv of the variable resistor 8 is set so as to satisfy the expression (4), the effect of the circuit resistance Rc can be reduced. Hence, if the potential difference applied between both ends of the internal short-circuit part 3 is set to substantially zero volts and the electric current flowing through the internal short-circuit part 3 is reduced infinitely to zero, the Joule heat generated by the internal short-circuit part 3 can be kept down. This makes it possible to improve safety in the power supply apparatus 10a.

Therefore, for example, based on the resistance value Ri, the circuit resistance Rc and the number n of the parallel batteries in each battery block which are stored in advance in the ROM, the resistance-value setting processing portion 113 sets the resistance value Rv of the variable resistor 8, for example, in such a way that the expression (4) (the expression (5)) can be satisfied. Thereby, the electric current flowing through the internal short-circuit part 3 is reduced infinitely to zero, and the Joule heat generated by the internal short-circuit part 3 can be kept down. This makes it possible to improve safety in the power supply apparatus 10a.

In this case, if a single battery is connected in series with the battery 4C subjected the internal short-circuit, in other words, in the case of n=1, then Rv=−Rc in the expression (4). This makes it hard to set the resistance value Rv of the variable resistor 8 in such a way that the expression (4) is satisfied. However, the internal short-circuit battery 4C and the battery pack of the plurality of batteries 4D, 4E and 4F are connected in series in the power supply apparatus 10a. This makes the resistance value Rv a positive value in the expression (4). As a result, the resistance value Rv of the variable resistor 8 can be set to satisfy the expression (4), in other words, bring the electric current sent to the internal short-circuit part 3 to zero to the utmost.

On the other hand, if the short-circuit battery detection portion 111 does not detect an internal short-circuit in any of the batteries 4A to 4F, the resistance-value setting processing portion 113 brings the resistance value Rv of the variable resistor 8 as close to zero ohms as possible. Hence, it is set to substantially zero ohms, so that the power loss in the variable resistor 8 can be reduced at a normal time.

Incidentally, the variable resistor 8 may be replaced with a fixed resistor having the resistance value Rv which satisfies the expression (3), more desirably, the expression (4). In addition, without the resistance-value setting processing portion 113, the resistance value Rv of the variable resistor 8 may also be set, for example, at the time of production or maintenance of the power supply apparatus 10a so as to satisfy the expression (3), more desirably, the expression (4). Besides, the variable resistor 8 is not limited to the one whose resistance value can be continuously varied. For example, the variable resistor 8 may be formed by a fixed resistor having the resistance value Rv which satisfies the expression (3), more desirably, the expression (4) and a switch short-circuiting this fixed resistance value. The resistance-value setting processing portion 113 turns on and off this switch to set the resistance value Rv of the variable resistor 8.

(Third Embodiment)

Figure 7:
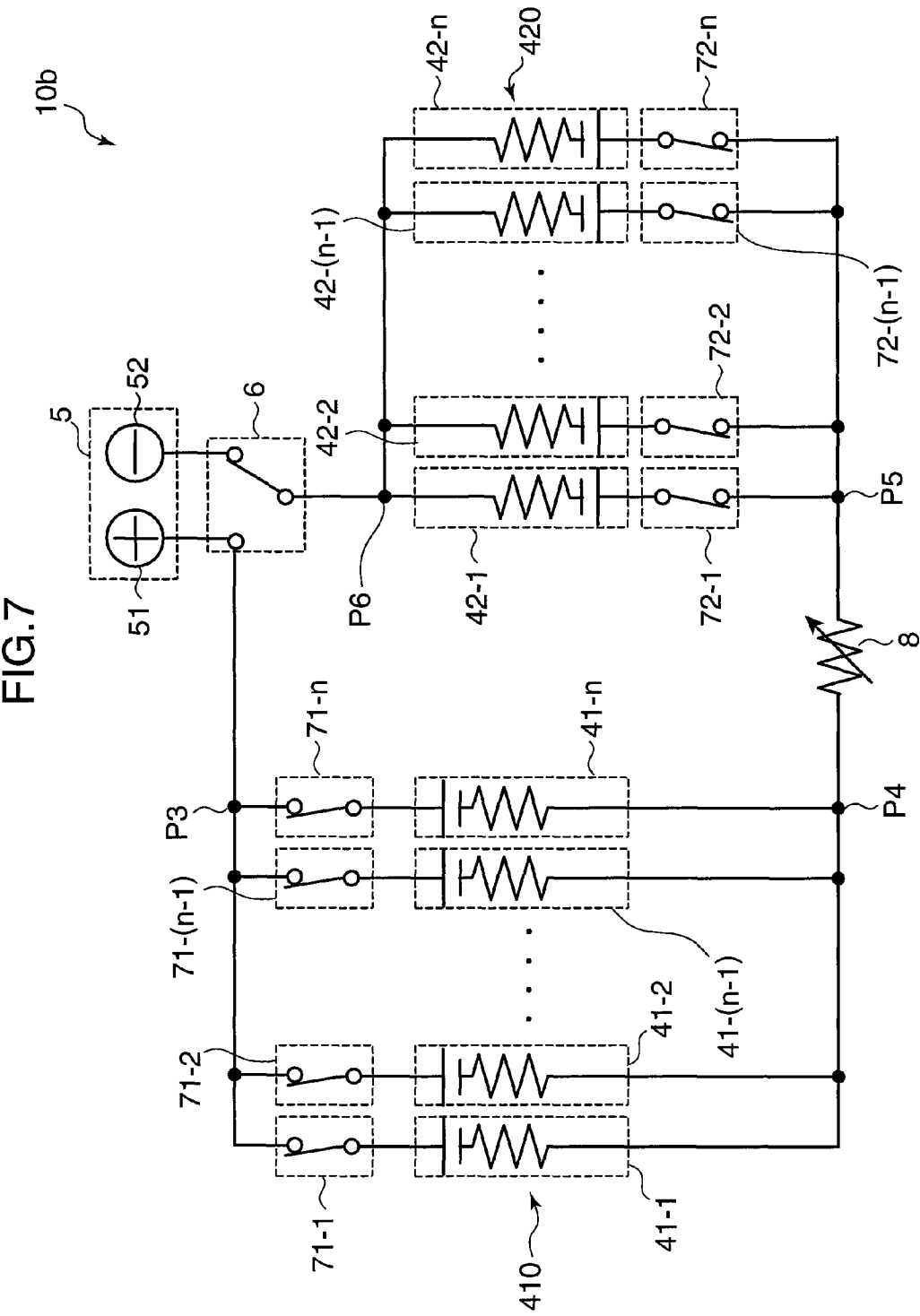
FIG. 7 is a circuit diagram showing an example of the configuration of a power supply apparatus according to a third embodiment of the present invention.

Next, a description will be given about a power supply apparatus according to a third embodiment of the present invention. FIG. 7 is a circuit diagram showing an example of the configuration of a power supply apparatus 10b according to the third embodiment. The power supply apparatus 10b shown in FIG. 7 is different from the power supply apparatus 10a shown in FIG. 4 in the following respect. The power supply apparatus 10b shown in FIG. 7 includes n batteries in parallel connected in two series. Instead of the batteries 4A to 4C and the switches 7A to 7C of the power supply apparatus 10a of FIG. 4, the power supply apparatus 10b of FIG. 7 includes a battery block 410 obtained by connecting in parallel the series circuits formed by connecting n batteries 41-1 to 41-n and n switches 71-1 to 71-n (the switching element) in series, respectively. Further, instead of the batteries 4D to 4F and the switches 7D to 7F of the power supply apparatus 10a of FIG. 4, the power supply apparatus 10b of FIG. 7 includes a battery block 420 obtained by connecting in parallel the series circuits formed by connecting n batteries 42-1 to 42-n and n switches 72-1 to 72-n (the switching element) in series, respectively. When those batteries and switches are generically mentioned, they will be represented below by reference characters and numerals whose appendixes are omitted. The appendixes thereof will be given when the individual configurations thereof are mentioned.

In this case, preferably, the number n of batteries in parallel should be within a range of $1 \leq n \leq 100$. It is also preferable that n be determined by the power characteristics of the batteries 41-1 to 41-n and the batteries 42-1 to 42-n in line with the current power of the power supply apparatus 10b. In FIG. 7, the control portion 11a is not shown, but similarly to the power supply apparatus 10a shown in FIG. 4, the control portion 11a controls the operations of the changeover switch 6 and the switches 71-1 to 71-n and 72-1 to 72-n.

Figure 8:
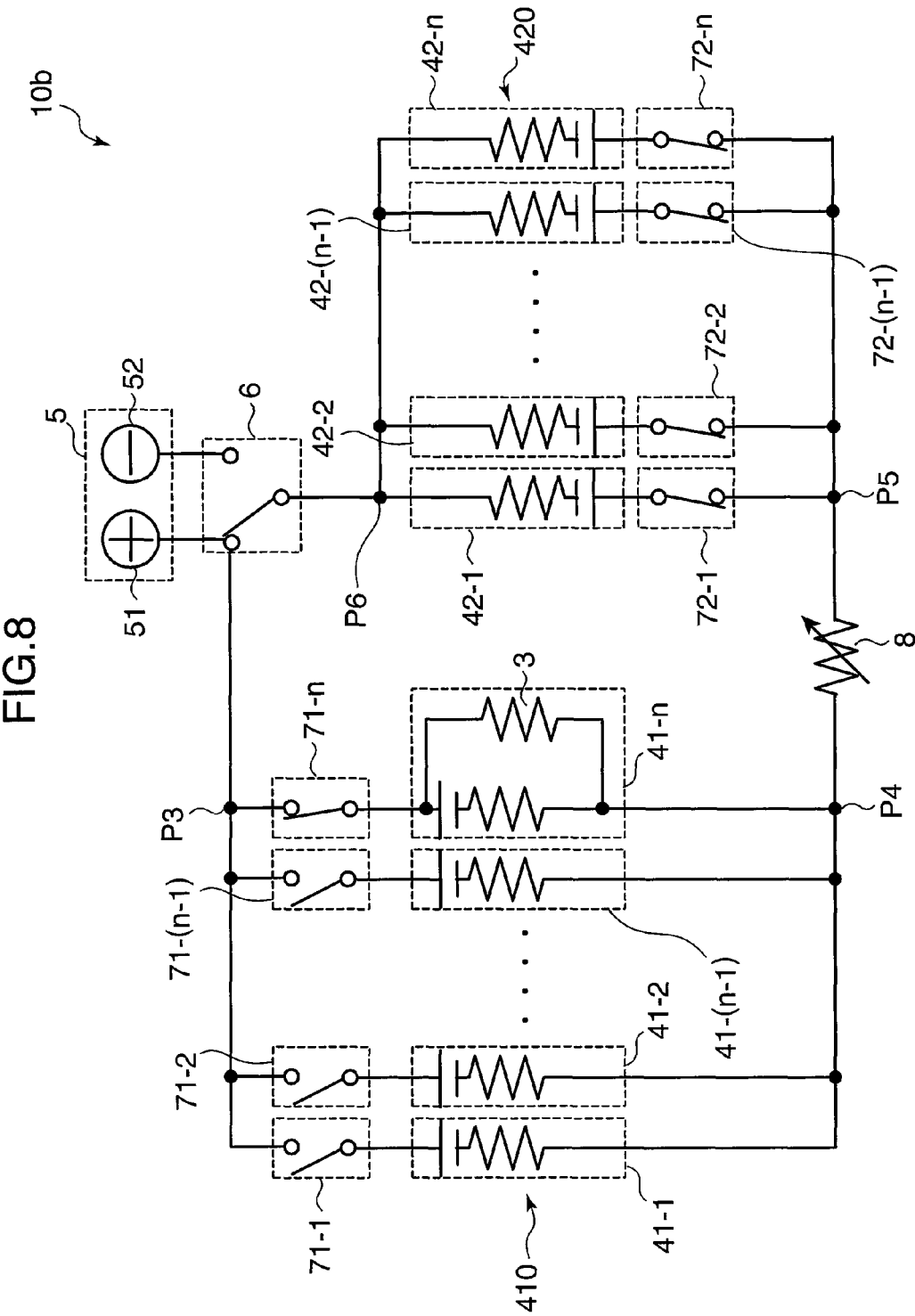
FIG. 8 is a circuit diagram showing an operation of the power supply apparatus of FIG. 7.

FIG. 8 is a circuit diagram showing an operation of the power supply apparatus of 10b of FIG. 7. In FIG. 8, an internal short-circuit is produced in the battery 41-n to thereby form an internal short-circuit part 3. In the same way as the power supply apparatus 10a of FIG. 4, based on a voltage, an electric current or a temperature or the like detected from the battery 41-n by the sensor (not shown), the short-circuit battery detection portion 111 detects the internal short-circuit produced in the battery 41-n. In response to a control signal from the changeover control portion 112a, the switches 71-1 to 71-(n−1) connected in series with the other batteries 41-1 to 41-(n−1) in the battery block 410 including the battery 41-n are turned off. This separates the batteries 41-1 to 41-(n−1) from the battery 41-n, so that the output current of the batteries 41-1 to 41-(n−1) will not flow through the internal short-circuit part 3. This helps reduce the heat generated by the internal short-circuit part 3, thus enhancing the safety.

Sequentially, the changeover switch 6 is changed in response to a control signal from the changeover control portion 112a in such a way that the connection point P6 of the batteries 42-1 to 42-n is connected to the connection point P3 of the switches 71-1 to 71-n. Thereby, the parallel circuit of the batteries 42-1 to 42-n, the battery 41-n and the variable resistor 8 are connected in series to thereby form a closed circuit.

Then, for example, based on the resistance value Ri, the circuit resistance Rc and the number n of the parallel batteries in each battery block which are stored in advance in the ROM, the resistance-value setting processing portion 113 sets the resistance value Rv of the variable resistor 8, for example, in such a way that the expression (4) can be satisfied. Thereby, the electric current flowing through the internal short-circuit part 3 is reduced infinitely to zero, and the Joule heat generated by the internal short-circuit part 3 can be kept down. This makes it possible to improve safety in the power supply apparatus 10b.

(Fourth Embodiment)

Figure 9:
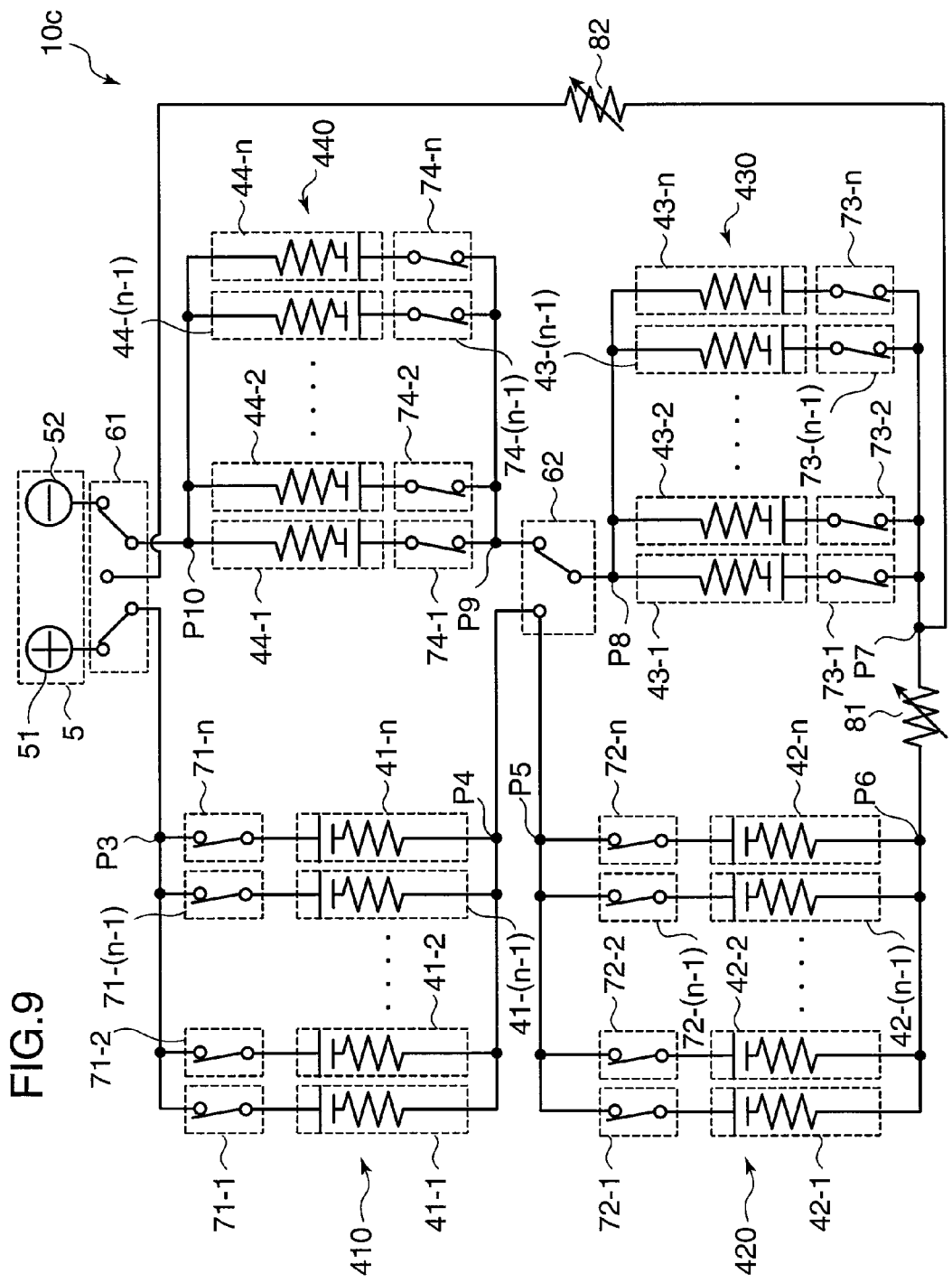
FIG. 9 is a circuit diagram showing an example of the configuration of a power supply apparatus according to a fourth embodiment of the present invention.
Figure 10:
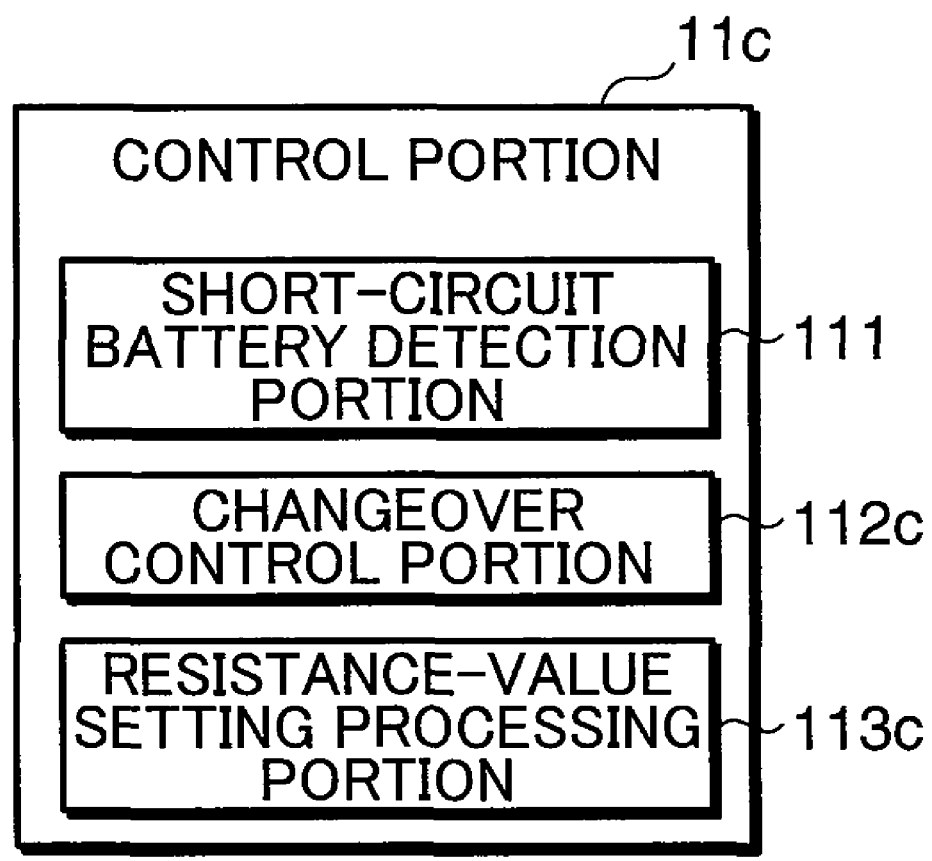
FIG. 10 is a block diagram showing an example of the configuration of a control portion in the power supply apparatus of FIG. 9.

Next, a description will be given about a power supply apparatus according to a fourth embodiment of the present invention. FIG. 9 and FIG. 10 show an example of the configuration of a power supply apparatus 10c according to the fourth embodiment. FIG. 9 is a circuit diagram showing an example of the configuration of the part excluding a control portion 11c of the power supply apparatus 10c. FIG. 10 is a block diagram showing an example of the configuration of the control portion 11c of the power supply apparatus 10c. The power supply apparatus 10c shown in FIGS. 9 and 10 is different from the power supply apparatus 10b shown in FIG. 7 in the following point. The power supply apparatus 10c shown in FIG. 9 includes four battery blocks connected in series each of which is made up of n batteries connected in parallel. The control portion 11c shown in FIG. 10 includes the short-circuit battery detection portion 111, a changeover control portion 112c and a resistance-value setting processing portion 113c.

The power supply apparatus 10c shown in FIG. 9 includes: battery blocks 410, 420, 430 and 440 (the first, second, third and fourth battery blocks); a changeover switch 61 (the first changeover switch); a changeover switch 62 (the second changeover switch); a variable resistor 81 (the first resistor portion); and a variable resistor 82 (the second resistor portion).

The battery block 430 is configured by connecting in parallel the series circuits formed by connecting n batteries 43-1 to 43-n and n switches 73-1 to 73-n (the switching element) in series, respectively. Similarly, the battery block 440 is configured by connecting in parallel the series circuits formed by connecting n batteries 44-1 to 44-n and n switches 74-1 to 74-n (the switching element) in series, respectively.

The positive electrode terminal 51 is connected via the changeover switch 61 to the connection point P3 of the switches 71-1 to 71-n in the battery block 410. The connection point P4 of the batteries 41-1 to 41-n in the battery block 410 is connected to the connection point P5 of the switches 72-1 to 72-n in the battery block 420. The connection point P6 of the batteries 42-1 to 42-n in the battery block 420 is connected via the variable resistor 81 to a connection point P7 of the switches 73-1 to 73-n in the battery block 430. A connection point P8 of the batteries 43-1 to 43-n in the battery block 430 is connected via the changeover switch 62 to a connection point P9 of the switches 74-1 to 74-n in the battery block 440.

Further, a connection point P10 of the batteries 44-1 to 44-n in the battery block 440 is connected via the changeover switch 61 to the negative electrode terminal 52. Then, the connection point P7 is connected to the changeover switch 61 via the variable resistor 82.

The variable resistors 81 and 82 are each formed in the same ways as the variable resistor 8. The changeover switch 62 connects the connection point P8 to either the connection point P4 of the connection point P5 or the connection point P9 in response to a control signal from the changeover control portion 112c. In response to a control signal from the changeover control portion 112c, the changeover switch 61 connects the connection point P3 to either of the positive electrode terminal 51 and the variable resistor 82 and connects the connection point P10 to either of the negative electrode terminal 52 and the variable resistor 82.

The changeover control portion 112c shown in FIG. 10 controls the switching of the changeover switches 61 and 62 and the on and off of the switches 71, 72, 73 and 74. The resistance-value setting processing portion 113c shown in FIG. 10 sets the resistance values of the variable resistors 81 and 82.

Figure 11:
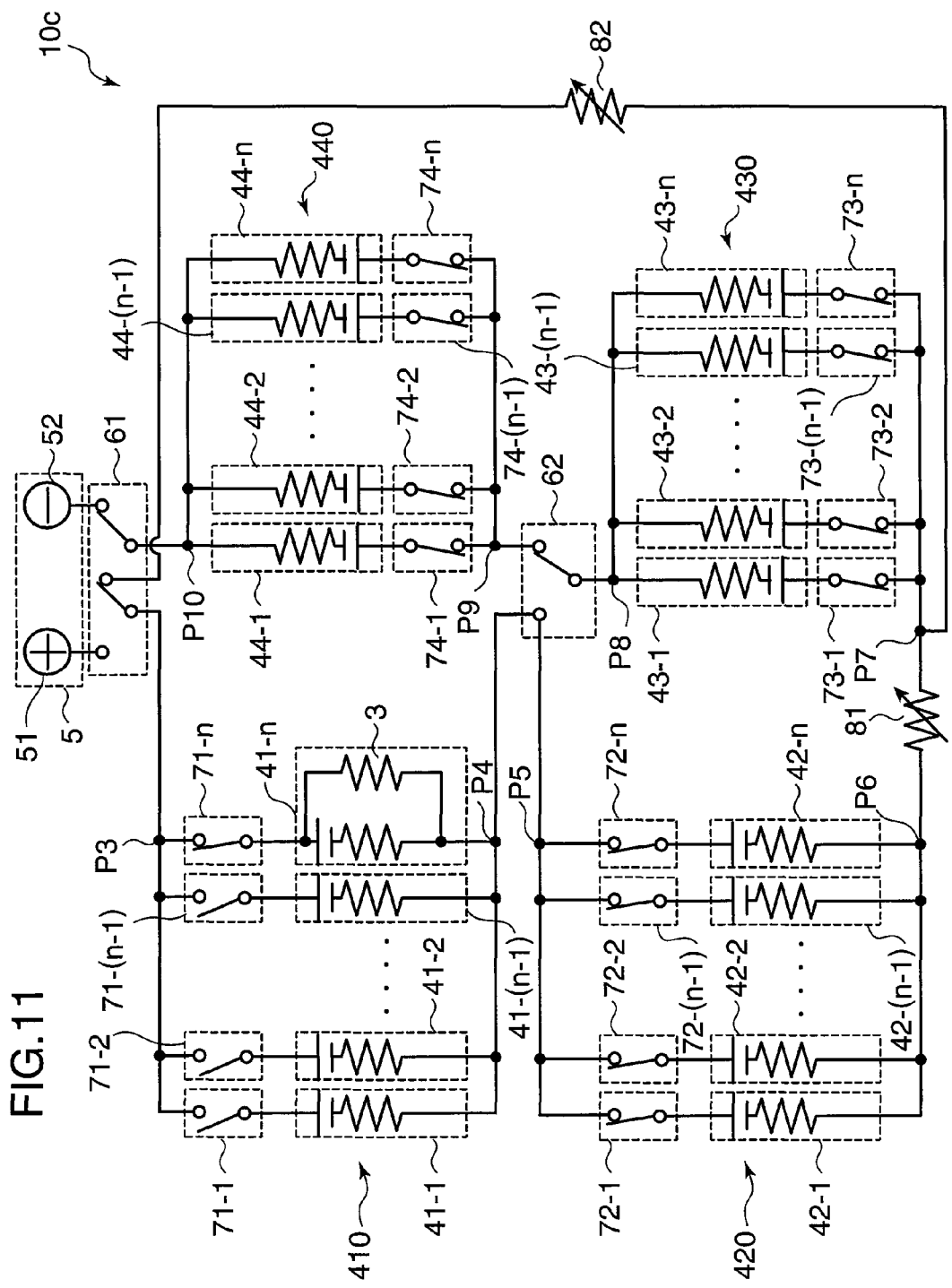
FIG. 11 is a circuit diagram showing an operation of the power supply apparatus of FIG. 10.
Figure 12:
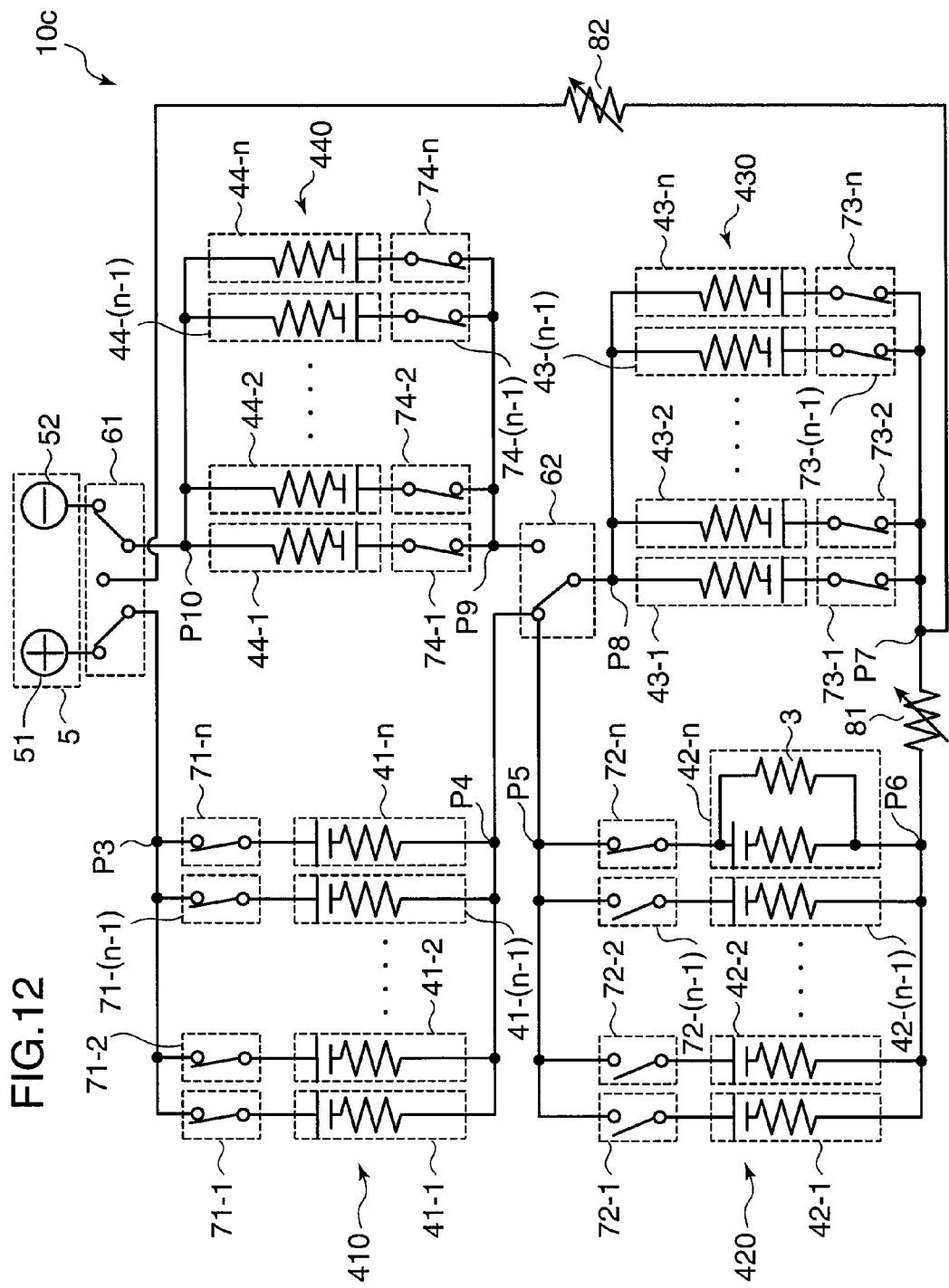
FIG. 12 is a circuit diagram showing an operation of the power supply apparatus of FIG. 10.

Next, an operation will be described of the power supply apparatus 10c shown in FIGS. 9 and 10. FIGS. 11 and 12 are a circuit diagram showing the operation of the power supply apparatus 10c of FIGS. 9 and 10. In FIG. 11, an internal short-circuit is produced in the battery 41-n to thereby form an internal short-circuit part 3. In the same way as the power supply apparatus 10a of FIG. 4, based on a voltage, an electric current or a temperature or the like detected from the battery 41-n by the sensor (not shown), the short-circuit battery detection portion 111 detects the internal short-circuit produced in the battery 41-n.

In response to a control signal from the changeover control portion 112a, the switches 71-1 to 71-(n−1) connected in series with the other batteries 41-1 to 41-(n−1) in the battery block 410 including the battery 41-n are turned off. This separates the batteries 41-1 to 41-(n−1) from the battery 41-n, so that the output current of the batteries 41-1 to 41-(n−1) will not flow through the internal short-circuit part 3. This helps reduce the heat generated by the internal short-circuit part 3, thus enhancing the safety.

Sequentially, the changeover switch 61 is changed in response to a control signal from the changeover control portion 112c in such a way that the connection point P3 is connected to the variable resistor 82. Thereby, the battery block 410, the battery block 420 and the variable resistors 81 and 82 are connected in series to thereby form a closed circuit.

In the closed circuit formed in this way, let's assume that all the resistance values of the internal resistors of the batteries 41-1 to 41-n and the batteries 42-1 to 42-n are the same Ri. When the resistance value of the variable resistor 81 is Rva and the resistance value of the variable resistor 82 is Rvb, if the relationship given by the following expression (6) is satisfied, the potential difference applied between both ends of the internal short-circuit part 3 becomes substantially zero volts. Consequently, the electric current flowing through the internal short-circuit part 3 can be reduced.

$$Rva + Rvb + Ri/n = Ri \quad (6)$$

$$Rva + Rvb = Ri - Ri/n$$
$$= Ri \times (n-1)/n$$

Herein, an unintended closed-circuit resistance is Rc, such as resistance in the wiring connecting each battery, the variable resistors 81 and 82 and the changeover switches 61 and 62, and on-resistance of the changeover switches 61 and 62, then the expression (6) is replaced with the following more precise expression (7).

$$Rva + Rvb + Ri/n + Rc = Ri \quad (7)$$

$$Rva + Rvb = Ri - Ri/n - Rc$$
$$= (Ri \times (n-1)/n) - Rc$$

Then, for example, based on the resistance value Ri, the circuit resistance Rc and the number n of the parallel batteries in each battery block which are stored in advance in the ROM, the resistance-value setting processing portion 113c sets the resistance values Rva and Rvb of the variable resistors 81 and 82, for example, in such a way that the expression (7) can be satisfied. Thereby, the effect of the circuit resistance Rc can be reduced and the electric current flowing through the internal short-circuit part 3 is reduced infinitely to zero. Consequently, the Joule heat generated by the internal short-circuit part 3 can be kept down, thus improving safety in the power supply apparatus 10c.

In FIG. 12, an internal short-circuit is produced in the battery 42-n to thereby form an internal short-circuit part 3. In the same way as the power supply apparatus 10a of FIG. 4, based on a voltage, an electric current or a temperature or the like detected from the battery 42-n by the sensor (not shown), the short-circuit battery detection portion 111 detects the internal short-circuit produced in the battery 42-n. In response to a control signal from the changeover control portion 112a, the switches 72-1 to 72-(n−1) connected in series with the other batteries 42-1 to 42-(n−1) in the battery block 420 including the battery 42-n are turned off. This separates the batteries 42-1 to 42-(n−1) from the battery 42-n, so that the output current of the batteries 42-1 to 42-(n−1) will not flow through the internal short-circuit part 3. This helps reduce the heat generated by the internal short-circuit part 3, thus enhancing the safety.

Sequentially, the changeover switch 62 is changed in response to a control signal from the changeover control portion 112c in such a way that the connection point P8 is connected to the connection point of the connection point P4 and the connection point P5. Thereby, the battery block 420, the battery block 430 and the variable resistor 81 are connected in series to thereby form a closed circuit.

In the closed circuit formed in this way, let's assume that all the resistance values of the internal resistors of the batteries 42-1 to 42-n and the batteries 43-1 to 43-n are the same Ri. When the resistance value of the variable resistor 81 is Rva, if the relationship given by the following expression (8) is satisfied, the potential difference applied between both ends of the internal short-circuit part 3 becomes substantially zero volts. Consequently, the electric current flowing through the internal short-circuit part 3 can be reduced.

$$Rva = Ri \times (n-1)/n \quad (8)$$

Herein, an unintended closed-circuit resistance is Rc, such as resistance in the wiring connecting each battery, the variable resistor 81 and the changeover switch 62, and on-resistance of the changeover switch 62, then the expression (8) is replaced with the following more precise expression (9).

$$Rva = (Ri \times (n-1)/n) - Rc \quad (9)$$

Then, for example, based on the resistance value Ri, the circuit resistance Rc and the number n of the parallel batteries in each battery block which are stored in advance in the ROM, the resistance-value setting processing portion 113c sets the resistance value Rva of the variable resistor 81, for example, in such a way that the expression (9) can be satisfied. Thereby, the effect of the circuit resistance Rc can be reduced and the electric current flowing through the internal short-circuit part 3 is reduced infinitely to zero. Consequently, the Joule heat generated by the internal short-circuit part 3 can be kept down, thus enhancing safety in the power supply apparatus 10c.

In the same way, if an internal short-circuit is produced in any of the batteries 43-1 to 43-n included in the battery block 430, the short-circuit battery detection portion 111 identifies this internal short-circuit battery. Then, the changeover control portion 112a turns off the switch 73 connected in series with the other batteries except the internal short-circuit battery of the battery batteries included in the battery block 430.

Sequentially, the changeover switch 62 is changed in response to a control signal from the changeover control portion 112c in such a way that the connection point P8 is connected to the connection point of the connection point P4 and the connection point P5. Thereby, the battery block 420, the battery block 430 and the variable resistor 81 are connected in series to thereby form a closed circuit.

In the closed circuit formed like this, similarly to the case where an internal short-circuit is produced in the battery block 420, based on the resistance value Ri, the circuit resistance Rc and the number n of the parallel batteries in each battery block which are stored in advance in the ROM, the resistance-value setting processing portion 113c sets the resistance value Rva of the variable resistor 81, for example, in such a way that the expression (9) can be satisfied. Thereby, the electric current flowing through the internal short-circuit part is reduced infinitely to zero so that the Joule heat generated by the internal short-circuit part can be kept down. This makes it possible to enhance safety in the power supply apparatus 10c.

Furthermore, if an internal short-circuit is produced in any of the batteries 44-1 to 44-n included in the battery block 440, the short-circuit battery detection portion 111 identifies this internal short-circuit battery. Then, the changeover control portion 112C turns off the switch 74 connected in series with the other batteries except the internal short-circuit battery included in the battery block 440.

Sequentially, the changeover switch 62 connects the connection point P8 and the connection point P9, and the changeover switch 61 connects the connection point P10 and the variable resistor 82. Thereby, the battery block 440, the battery block 430 and the variable resistor 82 are connected in series to thereby form a closed circuit.

In the closed circuit formed like this, based on the resistance value Ri, the circuit resistance Rc and the number n of the parallel batteries in each battery block which are stored in advance in the ROM, the resistance-value setting processing portion 113c sets the resistance value Rvb of the variable resistor 82, for example, in such a way that the expression (10) can be satisfied.

$$Rvb = (Ri \times (n-1)/n) - Rc \qquad (10)$$

Therefore, even if an internal short-circuit is produced in any of the plurality of batteries provided in the power supply apparatus 10c, this internal short-circuit battery can be identified to thereby reduce the electric current flowing through its internal short-circuit part. This helps restrain the internal short-circuit part from generating Joule heat and keep the temperature and internal pressure of this battery from rising sharply. As a result, the power supply apparatus 10c becomes safer.

Incidentally, the batteries 4A to 4F and the batteries 41 to 44 are each not limited to a lithium secondary battery. The present invention can be applied to a power supply apparatus provided with each type of battery such as a lead storage battery and a nickel-hydrogen battery.

Moreover, the resistance-value setting processing portions 113 and 113c are each not limited to setting the resistance values of the variable resistors 8, 81 and 82 based upon the expressions (4) to (10). For example, each sensor attached to the batteries 4A to 4F and the batteries 41 to 44 is formed, for example, as the voltage detection portion such as an A/D converter. Thereby, it detects the terminal voltage of each battery. If the short-circuit battery detection portion 111 detects an internal short-circuit produced in a battery, the resistance-value setting processing portions 113 and 113c may also set the resistance values of the variable resistors 8, 81 and 82 in such a way that the inter-terminal voltage of this internal short-circuit battery detected by the sensor drops, desirably, to substantially zero volts.

In this case, the inter-terminal voltage of the internal short-circuit battery, in other words, the voltage between both ends of the internal short-circuit part falls to thereby reduce the electric current flowing through the internal short-circuit part. This restrains the internal short-circuit part from generating Joule heat. This helps make the power supply apparatuses 10a, 10b and 10c safer. Besides, even if the resistance value Ri of a battery changes through its cycle degradation, aged degradation or the like, the electric current flowing through the internal short-circuit part can be reduced to nearly zero. This makes it possible to improve the safety of the power supply apparatuses 10a, 10b and 10c, regardless of such a change in the characteristics of the battery.

In addition, as described above, in the power supply apparatuses 10a, 10b and 10c, if the short-circuit battery detection portion 111 detects an internal short-circuit produced in a battery, the parallel circuit of the plurality of batteries excluding the internal short-circuit and this internal short-circuit battery are connected in series to thereby form a closed circuit. Thereby, Rv, Rva+Rvb, Rva and Rvb can be made positive values in the expressions (4), (7), (9) and (10). As a result, the resistance-value setting processing portions 113 and 113c can set the resistance values of the variable resistors 8, 81 and 82 in such a way that the inter-terminal voltage of the internal short-circuit battery drops, desirably, to substantially zero volts. This helps decrease the effect of the unintended circuit resistance Rc, such as wiring resistance and on-resistance of a changeover switch. Hence, the electric current flowing through the internal short-circuit part can be reduced infinitely to zero. This makes it possible to enhance the safety of the power supply apparatuses 10a, 10b and 10c, regardless of a change in characteristics of the battery.

The power supply apparatus according to the present invention includes: a plurality of batteries; a changeover portion switching the connection between the plurality of batteries; a short-circuit battery detection portion, if an internal short-circuit is produced in any of the plurality of batteries, detecting this internal short-circuit battery; and a changeover control portion, if the short-circuit battery detection portion detects the internal short-circuit battery, allowing the changeover portion to switch the connection between the plurality of batteries in such a way that this internal short-circuit battery and at least one of the other batteries are connected in series to thereby form a closed circuit.

According to this configuration, if an internal short-circuit is produced in any of the plurality of batteries, the short-circuit battery detection portion detects this internal short-circuit battery. Then, the changeover control portion allows the changeover portion to switch the connection between the plurality of batteries in such a way that the internal short-circuit battery and at least one of the other batteries are connected in series to thereby form a closed circuit. Thereby, to both ends of the internal short-circuit battery, in other words, both ends of the part where the internal short-circuit is produced, a voltage having a mutually reverse polarity is applied to thereby offset each other. This lowers the voltage given to the internal short-circuit part, reduces the electric current sent to the internal short-circuit part and decreases the heat generated in the internal short-circuit part. This makes it possible to enhance safety when an internal short-circuit is produced in a battery.

Furthermore, it is preferable that: the plurality of batteries are connected at least partly in parallel; and if the short-circuit battery detection portion detects an internal short-circuit produced in the batteries connected in parallel, the changeover control portion further allows the changeover portion to cut off the connection of the battery other than this internal short-circuit battery of the batteries connected in parallel and the internal short-circuit battery.

According to this configuration, if the short-circuit battery detection portion detects an internal short-circuit produced in the batteries connected in parallel, the changeover portion disconnects this internal short-circuit battery from the other battery connected in parallel. Therefore, no electric current is supplied to the internal short-circuit battery from the battery not subjected to this internal short-circuit among the batteries connected in parallel. This reduces the electric current sent to the internal short-circuit part and decreases the heat generated in the internal short-circuit part. This makes it possible to enhance safety when an internal short-circuit is produced in a battery.

Moreover, the plurality of batteries may be formed by connecting a plurality of battery blocks in series each of which has n (n is an integer at least two) batteries connected in parallel; a resistor portion may be further provided which has a resistance value substantially equal to $Ri \times (n-1)/n$ if the internal resistance value of each of the plurality of batteries is $Ri$; and if the short-circuit battery detection portion detects an internal short-circuit produced in the batteries connected in parallel, the changeover control portion may allow the changeover portion to switch the connection between the plurality of batteries and the resistor portion in such a way that the battery block including this internal short-circuit battery, one of the other battery blocks and the resistor portion are connected in series to thereby form a closed circuit.

According to this configuration, if the short-circuit battery detection portion detects an internal short-circuit produced in the n batteries connected in parallel, the changeover control portion may allow the changeover portion to switch the connection between the plurality of batteries and the resistor portion in such a way that the battery block including this internal short-circuit battery, one of the other battery blocks and the resistor portion having a resistance value substantially equal to $Ri \times (n-1)/n$ are connected in series to thereby form a closed circuit. Therefore, the internal resistance of each battery and the resistance of the resistor portion balance the resistance around the internal short-circuit part. This helps further reduce the electric current sent to the internal short-circuit part.

In addition, it is preferable that: the resistance value of the resistor portion be variable; a resistance-value setting processing portion setting a resistance value of the resistor portion be further provided; and the resistance-value setting processing portion set the resistance value of the resistor portion substantially to $Ri \times (n-1)/n$.

According to this configuration, the resistance-value setting processing portion sets the resistance value of the resistor portion substantially to $Ri \times (n-1)/n$. Therefore, the internal resistance of each battery and the resistance of the resistor portion balance the resistance around the internal short-circuit part. This helps further reduce the electric current sent to the internal short-circuit part.

Furthermore, it is preferable that: a connection terminal for outputting output power of the plurality of batteries to the outside be further provided; the changeover portion include a changeover switch switching the connection of the series circuit formed by connecting the plurality of battery blocks in series and the connection terminal; as the battery blocks, two be connected in series in such a way that the resistor portion is disposed between; if the short-circuit battery detection portion does not detect the internal short-circuit battery, the changeover control portion allow the changeover portion to connect both ends of the series circuit of the two battery blocks and the resistor portion to the connection terminal; and if the short-circuit battery detection portion detects the internal short-circuit battery, the changeover control portion allow the changeover portion to connect one end of the series circuit of the two battery blocks and the resistor portion to the other end of this series circuit to thereby form the closed circuit.

According to this configuration, if an internal short-circuit is produced in any of the plurality of batteries, the connection between the plurality of batteries is switched in such a way that the battery block including this internal short-circuit battery, the other battery block and the resistor portion are connected in series to thereby form a closed circuit. As described above, this reduces the electric current flowing through the internal short-circuit part and decreases the heat generated in the internal short-circuit part. This makes it possible to improve safety when an internal short-circuit is produced in a battery.

Moreover, it is preferable that: the changeover portion further includes a plurality of switching elements individually connected in series with batteries; each battery block is formed by connecting in parallel n series circuits each including the battery and the switching element; and if the short-circuit battery detection portion detects the internal short-circuit battery, the changeover control portion further turns off the switching element connected in series with the battery other than this internal short-circuit battery in the battery block including the internal short-circuit battery to thereby disconnect the internal short-circuit battery from the other battery.

According to this configuration, if the short-circuit battery detection portion detects an internal short-circuit, the changeover portion turns off the switching element connected in series with the battery other than this internal short-circuit battery in the battery block including the internal short-circuit battery. Therefore, no electric current is supplied to the internal short-circuit battery from the battery not subjected to this internal short-circuit among the batteries connected in parallel. This reduces the electric current sent to the internal short-circuit part and decreases the heat generated in the internal short-circuit part. This makes it possible to enhance safety when an internal short-circuit is produced in a battery.

Moreover, it is preferable that: two connection terminals for outputting output power of the plurality of batteries to the outside are further provided; the plurality of battery blocks are first, second, third and fourth battery blocks; the resistor portion includes first and second resistor portions; the first battery block, the second battery block, the first resistor portion, the third battery block and the fourth battery block are connected in series in this order to thereby form a main series circuit; one end of the second resistor portion is connected to the connection point of the first resistor portion and the third battery block; the changeover portion includes a first changeover switch which switches the connection between the main series circuit, the other end of the second resistor portion and the two connection terminals, and a second changeover switch which switches the connection between the plurality of battery blocks; if the short-circuit battery detection portion does not detect the internal short-circuit battery, the changeover control portion allows the first changeover switch to connect both ends of the main series circuit with the two connection terminals respectively; if the short-circuit battery detection portion detects the internal short-circuit battery in the first battery block, the changeover control portion allows the first changeover switch to connect a terminal of the first battery block opposite to the connection point thereof with the second battery block and the other end of the second resistor portion, and the resistance-value setting processing portion sets the total of the resistance values of the first and second resistor portions substantially to $Ri \times (n-1)/n$; if the short-circuit battery detection portion detects the internal short-circuit battery in either of the second battery block and the third battery block, the changeover control portion allows the second changeover switch to connect the connection point of the first battery block and the second battery block to the connection point of the third battery block and the fourth battery block, and the resistance-value setting processing portion sets the resistance value of the first resistor portion substantially to $Ri \times (n-1)/n$; and if the short-circuit battery detection portion detects the internal short-circuit battery in the fourth battery block, the changeover control portion allows the first changeover switch to connect a terminal of the fourth battery block opposite to the connection point thereof with the third battery block and the other end of the second resistor portion, and the resistance-value setting processing portion sets the resistance value of the second resistor portion substantially to $Ri \times (n-1)/n$.

According to this configuration, if an internal short-circuit is produced in any of the plurality of batteries, the connection between the plurality of batteries is switched in such a way that the battery block including this internal short-circuit battery, one of the other battery blocks and at least one of the first and second resistor portions are connected in series to thereby form a closed circuit. As described above, this reduces the electric current flowing through the internal short-circuit part and decreases the heat generated in the internal short-circuit part. This makes it possible to improve safety when an internal short-circuit is produced in a battery.

In addition, it is preferable that: the changeover portion further includes a plurality of switching elements individually connected in series with batteries; the plurality of battery blocks are formed by connecting n series circuits of the battery and the switching element in parallel; and if the short-circuit battery detection portion detects the internal short-circuit battery, the changeover control portion further turns off the switching element connected in series with the batteries other than this internal short-circuit battery in the battery block including the internal short-circuit battery to thereby disconnect the internal short-circuit battery from the batteries.

According to this configuration, if an internal short-circuit is produced in any of the plurality of batteries, this internal short-circuit battery is disconnected from the other battery in the battery block including the internal short-circuit battery. Therefore, no electric current is supplied to the internal short-circuit battery from the battery not subjected to this internal short-circuit among the batteries connected in parallel. This reduces the electric current sent to the internal short-circuit part and decreases the heat generated in the internal short-circuit part. This makes it possible to enhance safety when an internal short-circuit is produced in a battery.

Furthermore, the above described power supply apparatus may further include: a voltage detection portion detecting each terminal voltage of the plurality of batteries; a resistor portion whose resistance value is variable; and a resistance-value setting processing portion setting a resistance value of the resistor portion, in which: if the short-circuit battery detection portion detects the internal short-circuit battery, the changeover control portion may allow the changeover portion to switch the connection between the plurality of batteries and the variable resistor portion in such a way that the closed circuit includes the variable resistor; and if the short-circuit battery detection portion detects the internal short-circuit battery, the resistance-value setting processing portion may set the resistance value of the resistor portion so as to drop an inter-terminal voltage detected in the internal short-circuit battery by the voltage detection portion.

According to this configuration, if the short-circuit battery detection portion detects the internal short-circuit battery, the changeover portion connects this internal short-circuit battery, at least one of the other batteries and the variable resistor in series to thereby form a closed circuit. Then, the resistance-value setting processing portion sets the resistance value of the resistor portion so as to drop the inter-terminal voltage of the internal short-circuit battery, in other words, the voltage applied to the internal short-circuit part. This reduces the electric current flowing through the internal short-circuit part and reduces the heat generated in the internal short-circuit part, regardless of a change in the internal resistance of a battery caused by its degradation, a temperature environment or the like. This makes it possible to improve safety when an internal short-circuit is produced in a battery.

Moreover, it is preferable that in forming the closed circuit, the changeover control portion allow the changeover portion to switch the connection between the plurality of batteries in such a way that the parallel circuit of the plurality of batteries other than this internal short-circuit battery and the internal short-circuit battery are connected in series to thereby form a closed circuit.

According to this configuration, if the short-circuit battery detection portion detects the internal short-circuit battery, the changeover portion connects in series this internal short-circuit battery, the parallel circuit of the plurality of batteries other than the internal short-circuit battery and the variable resistor. Thereby a closed circuit is formed. In this case, the combined internal-resistance value of the parallel circuit of the plurality of batteries becomes smaller than the internal resistance of the internal short-circuit battery. Hence, the resistance value of the variable resistor is raised to thereby take the balance of resistance in the closed circuit, so that the electric current flowing through the internal short-circuit part can be reduced. Thereby, the resistance value of the variable resistor is added to the internal resistance of the batteries and a resistor other than the variable resistor, for example, a wiring resistor, a resistor produced in the changeover portion or the like in the closed circuit. This gives more room to take the resistance balance in the closed circuit. Consequently, the resistance balance in the closed circuit can be more easily taken to thereby reduce the electric current flowing through the internal short-circuit part.

The power supply apparatus according to the present invention is suitably useful as a small power-supply apparatus which supplies electric power for driving a potable electrical apparatus such as a cellular phone, a digital video camera and a notebook personal computer, as well as a battery pack as an example of such a power supply apparatus. It is also suitably useful as a large back-up power-supply apparatus at a factory, a hospital or the like, and a power supply apparatus employed as a power source for driving a vehicle such as a hybrid car, an electric car and a motor fork lift.

This application is based on Japanese patent application serial No. 2007-132731, filed in Japan Patent Office on May 18, 2007, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power supply apparatus, comprising:
    a plurality of batteries which are formed by connecting a plurality of battery blocks in series each of which has n (n is an integer of at least two) batteries connected in parallel;
    a changeover portion switching the connection between the plurality of batteries;
    a short-circuit battery detection portion, if an internal short-circuit is produced in any of the plurality of batteries, detecting this internal short-circuit battery;
    a resistor portion which has a resistance value substantially equal to $Ri \times (n-1)/n$ if the internal resistance value of each of the plurality of batteries is Ri, the resistance value being variable;
    a resistance-value setting processing portion setting the resistance value of the resistor portion substantially to $Ri \times (n-1)/n$;
    a changeover control portion, if the short-circuit battery detection portion detects the internal short-circuit produced in the batteries connected in parallel, allowing the changeover portion to switch the connection between the plurality of batteries and the resistor portion in such a way that the battery block including this internal short-circuit battery, one of the other battery blocks and the resistor portion are connected in series to thereby form a closed circuit; and
    a connection terminal for outputting output power of the plurality of batteries to the outside, wherein
    if the short-circuit battery detection portion detects the internal short-circuit produced in the batteries connected in parallel, the changeover control portion further allows the changeover portion to cut off the connection of the battery other than this internal short-circuit battery of the batteries connected in parallel and the internal short-circuit battery;
    the changeover portion includes a changeover switch switching the connection of the series circuit formed by connecting the plurality of battery blocks in series and the connection terminal;
    as the battery blocks, two are connected in series in such a way that the resistor portion is disposed between;
    if the short-circuit battery detection portion does not detect the internal short-circuit battery, the changeover control portion allows the changeover switch to connect both ends of the series circuit of the two battery blocks and the resistor portion to the connection terminal; and
    if the short-circuit battery detection portion detects the internal short-circuit battery, the changeover control portion allows the changeover switch to connect one end of the series circuit of the two battery blocks and the resistor portion to the other end of this series circuit to thereby form the closed circuit.

2. The power supply apparatus according to claim 1, wherein:
    the changeover portion further includes a plurality of switching elements individually connected in series with batteries;
    each battery block is formed by connecting in parallel n series circuits each including the battery and the switching element; and
    if the short-circuit battery detection portion detects the internal short-circuit battery, the changeover control portion further turns off the switching element connected in series with the battery other than this internal short-circuit battery in the battery block including the internal short-circuit battery to thereby disconnect the internal short-circuit battery from the other battery.

3. A power supply apparatus, comprising;
    a plurality of batteries which are formed by connecting a plurality of battery blocks in series each of which has n (n is an integer of at least two) batteries connected in parallel;
    a changeover portion switching the connection between the plurality of batteries;
    a short-circuit battery detection portion, if an internal short-circuit is produced in any of the plurality of batteries, detecting this internal short-circuit battery;
    a resistor portion which has a resistance value substantially equal to $Ri \times (n-1)/n$ if the internal resistance value of each of the plurality of batteries is Ri, the resistance value being variable:
    a resistance-value setting processing portion setting the resistance value of the resistor portion;
    a changeover control portion, if the short-circuit battery detection portion detects the internal short-circuit produced in the batteries connected in parallel, allowing the changeover portion to switch the connection between the plurality of batteries and the resistor portion in such a way that the battery block including this internal short-circuit battery, one of the other battery blocks and the resistor portion are connected in series to thereby form a closed circuit; and
    two connection terminals for outputting output power of the plurality of batteries to the outside; wherein:
    the plurality of battery blocks are first, second, third and fourth battery blocks;
    the resistor portion includes first and second resistor portions;
    the first battery block, the second battery block, the first resistor portion, the third battery block and the fourth battery block are connected in series in this order to thereby form a main series circuit;
    one end of the second resistor portion is connected to the connection point of the first resistor portion and the third battery block;
    the changeover portion includes a first changeover switch which switches the connection between the main series circuit, the other end of the second resistor portion and the two connection terminals, and a second changeover switch which switches the connection between the plurality of battery blocks;
    if the short-circuit battery detection portion does not detect the internal short-circuit battery, the changeover control portion allows the first changeover switch to connect both ends of the main series circuit with the two connection terminals respectively;

if the short-circuit battery detection portion detects the internal short-circuit battery in the first battery block, the changeover control portion allows the first changeover switch to connect a terminal of the first battery block opposite to the connection point thereof with the second battery block and the other end of the second resistor portion, and the resistance-value setting processing portion sets the total of the resistance values of the first and second resistor portions substantially to $Ri \times (n-1)/n$;

if the short-circuit battery detection portion detects the internal short-circuit battery in either of the second battery block and the third battery block, the changeover control portion allows the second changeover switch to connect the connection point of the first battery block and the second battery block to the connection point of the third battery block and the fourth battery block, and the resistance-value setting processing portion sets the resistance value of the first resistor portion substantially to $Ri \times (n-1)/n$; and if the short-circuit battery detection portion detects the internal short-circuit battery in the fourth battery block, the changeover control portion allows the first changeover switch to connect a terminal of the fourth battery block opposite to the connection point thereof with the third battery block and the other end of the second resistor portion, and the resistance-value setting processing portion sets the resistance value of the second resistor portion substantially to $Ri \times (n-1)/n$.

4. The power supply apparatus according to claim 3, wherein:

the changeover portion further includes a plurality of switching elements individually connected in series with batteries;

the plurality of battery blocks are formed by connecting n series circuits of the battery and the switching element in parallel; and if the short-circuit battery detection portion detects the internal short-circuit battery, the changeover control portion further turns off the switching element connected in series with the batteries other than this internal short-circuit battery in the battery block including the internal short-circuit battery to thereby disconnect the internal short-circuit battery from the batteries.

* * * * *